Jan. 18, 1966     D. J. HECK ETAL     3,229,833
COMBINED BOAT TRAILER AND ADJUSTABLE LENGTH DOCK
Filed Aug. 10, 1964     2 Sheets-Sheet 1
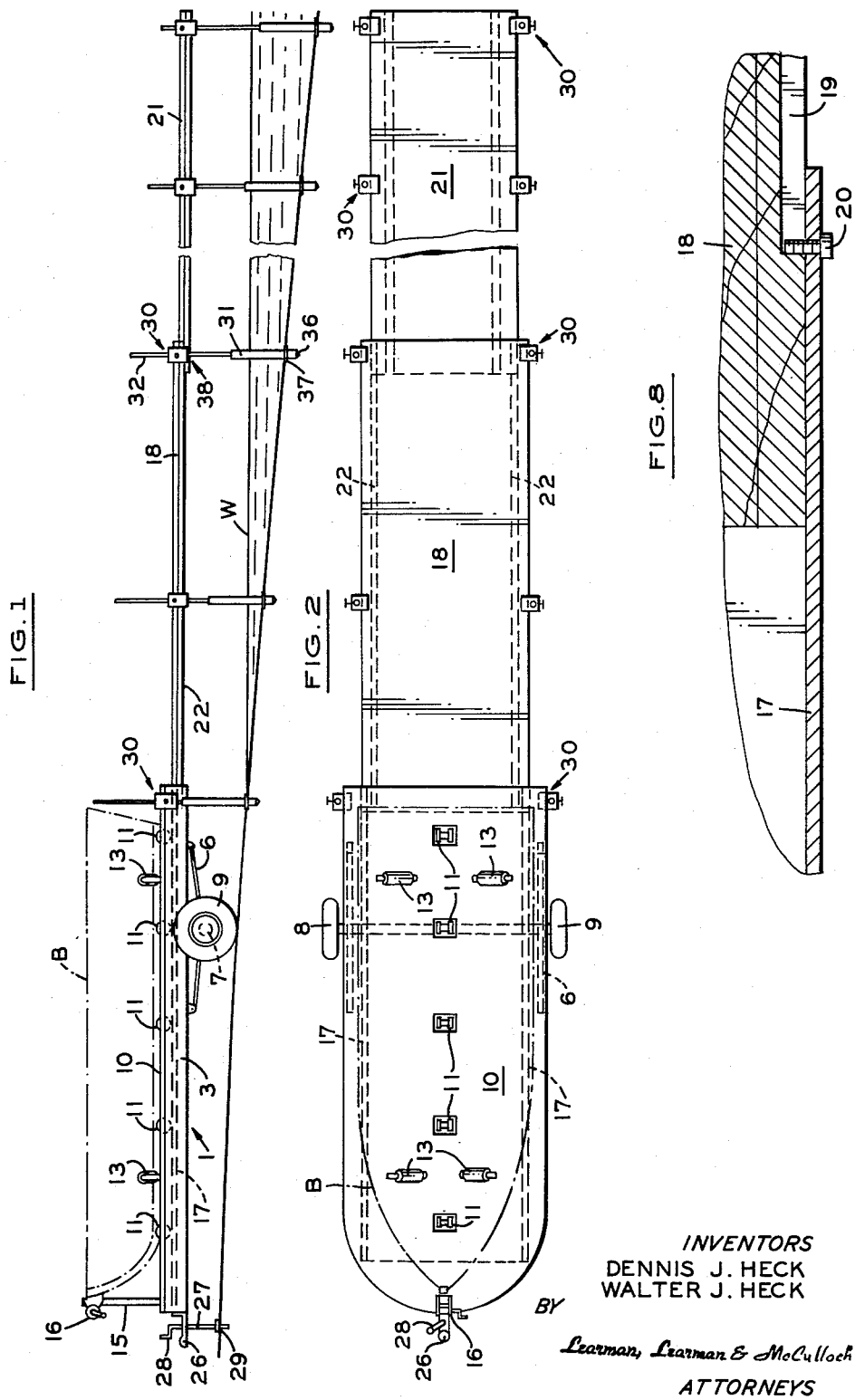
INVENTORS
DENNIS J. HECK
WALTER J. HECK
BY
Learman, Learman & McCulloch
ATTORNEYS Jan. 18, 1966      D. J. HECK ETAL      3,229,833
COMBINED BOAT TRAILER AND ADJUSTABLE LENGTH DOCK
Filed Aug. 10, 1964      2 Sheets-Sheet 2
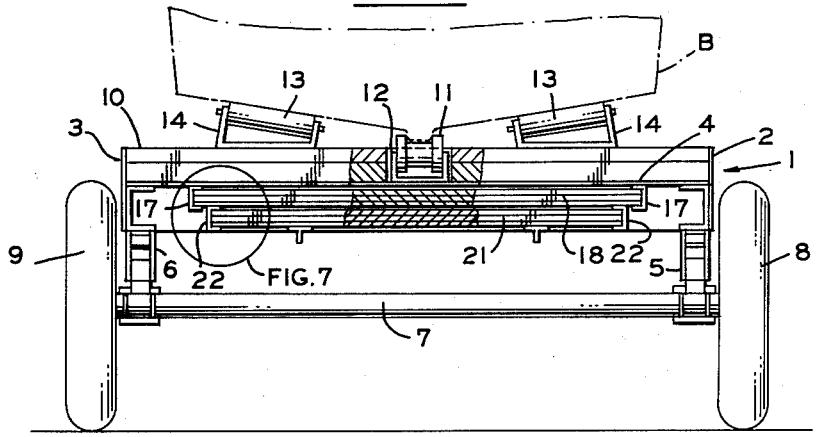
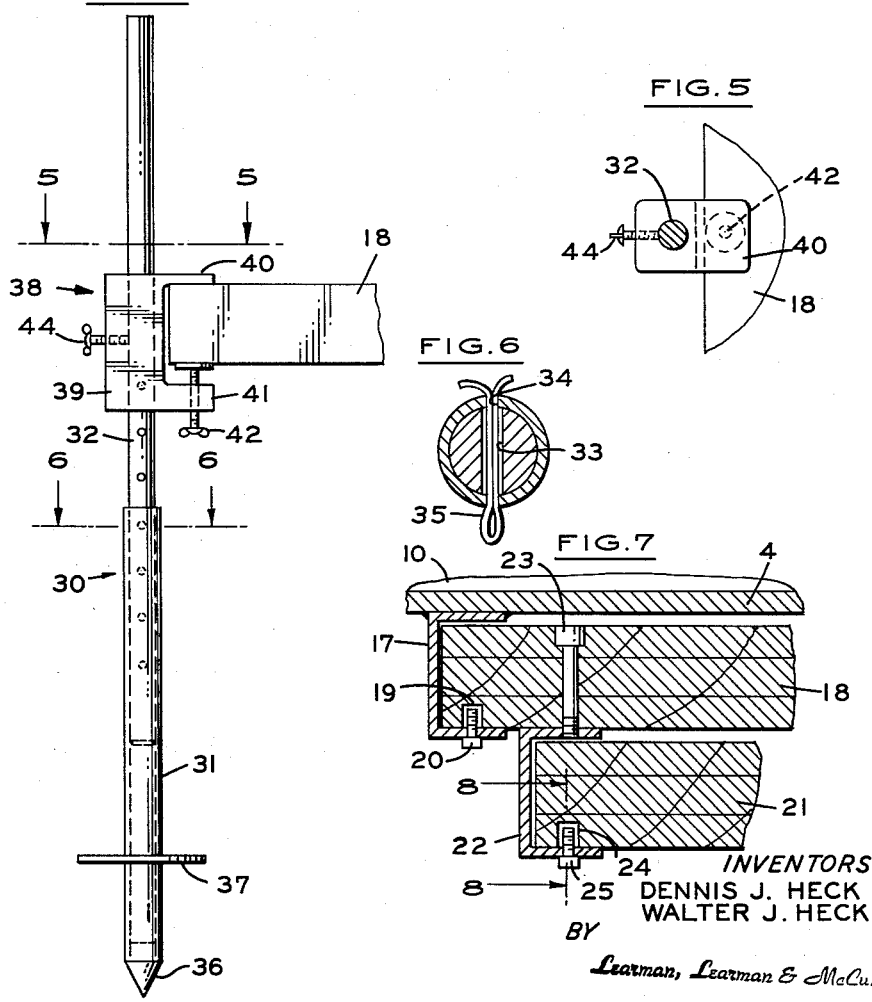
INVENTORS
DENNIS J. HECK
WALTER J. HECK
BY
*Learman, Learman & McCulloch*
ATTORNEYS United States Patent Office 3,229,833
Patented Jan. 18, 1966

3,229,833
COMBINED BOAT TRAILER AND ADJUSTABLE LENGTH DOCK
Dennis J. Heck and Walter J. Heck, both of 105 Kincheloe St., Kincheloe Air Force Base, Mich.
Filed Aug. 10, 1964, Ser. No. 388,453
13 Claims. (Cl. 214—84)

This invention relates to boat trailers and more particularly to a combined boat trailer and adjustable length dock construction which permits the towing of a boat to and from a body of water and facilitates access to and from the boat when it is in use.

The prior art discloses many different kinds of boat trailers, all of which are adapted for use in transporting boats to and from the sites of their use. Many such trailer constructions are adapted to be backed at least partially into the water of a lake or river so as to facilitate launching of the boat, whereas others have more complicated systems for effecting boat launching. Still other boat trailers are so designed as to be buoyant, thereby providing a floating launching device for boats. In none of the prior constructions, however, is it possible to launch the boat and subsequently anchor the boat trailer in such position that it may be used as a loading pier or dock. Accordingly, one of the primary objects of this invention is to provide a boat trailer which, when not in use as a trailer, may function as a dock or pier to facilitate access to and from a launched boat.

Another object of the invention is to provide a combined boat trailer and dock and which retains all of the advantages of conventional boat trailers.

A further object of the invention is to provide a combined trailer and dock and wherein the wheel assemblies of the trailer need not be submerged when the apparatus is in use as a dock.

Another object of the invention is to provide a combined trailer and dock wherein the dock is adjustable in length so as to enable it to be utilized in both shallow and deeper waters.

A further object of the invention is to provide adjustable supporting apparatus for a combined boat trailer and dock of the kind referred to and wherein the supporting apparatus may be adjusted so as to compensate for the incline of the bottom of the lake or river while enabling the dock or pier to be supported in substantially horizontal position.

Another object of the invention is to provide anchoring apparatus for the trailer portion of the apparatus so as to enable both it and the dock to be supported at a substantially horizontal level.

Other objects and advantages of the invention will be pointed out specifically or will become apparent from the following description when it is considered in conjunction with the appended claims and the accompanying drawings, in which:

FIGURE 1 is a fragmentary, side elevational view of a boat trailer and dock combination constructed in accordance with the invention, the apparatus being conditioned for operation as a dock;

FIGURE 2 is a top plan view of the apparatus shown in FIGURE 1;

FIGURE 3 is a rear elevational view of the apparatus shown in FIGURE 1, but with the extensible dock sections in their retracted positions, certain parts being shown in section for clarity of illustration;

FIGURE 4 is an enlarged, fragmentary, end elevational view of a supporting member and clamping device constructed in accordance with the invention;

FIGURE 5 is a cross-sectional view taken on the line 5—5 of FIGURE 4;

FIGURE 6 is a cross-sectional view taken on the line 6—6 of FIGURE 4;

FIGURE 7 is an enlarged, sectional detail of the portion of the apparatus enclosed within the circle shown in FIGURE 3; and FIGURE 8 is a sectional view taken on the line 8—8 of FIGURE 7.

Apparatus constructed in accordance with the invention comprises a framework 1 having parallel, longitudinal frame members 2 and 3 between which extend a suitable number of crossbars 4. To the frame members 2 and 3 is secured a pair of spring suspension members 5 and 6 to which is shackled an axle 7 on which is journaled a pair of ground engaging wheels 8 and 9.

Supported on the upper surface of the framework is a platform 10 which, at longitudinally spaced apart intervals, is provided with openings in each of which is mounted a rotatable roller 11. Each roller is mounted on a bracket 12, and the rollers 11 preferably are coincident with the longitudinal axis of the framework. On opposite sides of the longitudinal axis of the framework is mounted a plurality of inclined rollers 13, each of which is rotatably journaled in a bracket 14. The arrangement and configuration of the rollers are such that a boat B may be mounted on the framework with its keel supported by the rollers 11 and its bottom supported by the rollers 13.

At the forward end of the trailer is a stanchion 15 at the upper end of which is mounted a winch 16 and around which is trained a cable or the like that also is connected to the bow of the boat B so as to lock the boat in place on the trailer or, when desired, be used to assist movement of the boat to and from the trailer, as is conventional.

Beneath the platform 10 and fixed to the latter or to the frame members 2 and 3 is a pair of laterally spaced apart, parallel channel members 17 which together constitute a slideway in which is slideably mounted an extensible and retractable slide member 18. The length of the slide 18 preferably corresponds substantially to the length of the platform 10 and is slideable from a retracted position beneath and nested with the platform to a projected position in prolongation of the platform 10, as is illustrated in FIGURES 1 and 2.

Any one of a number of suitable guide devices may be utilized to guide the slide 18 in its movements and limit its sliding movement to such an amount as to preclude its inadvertent separation from the framework. For example, the lower surface of the member 18 may be longitudinally grooved for the major portion of its length, as is indicated at 19, and each of the members 17 may receive a threaded guide bolt 20 which is accommodated in the slot 19.

If desired, an auxiliary slide member 21 may be slideably mounted in parallel channel members 22 that are secured to the lower surface of the slide member 18 by a number of bolts 23, one of which is shown in FIGURE 7. A similar guide slot 24 may be formed adjacent each side of the member 21 and in which is accommodated a threaded guide bolt 25 that is removably supported by the slide channel 22. The slide member 21 may be moved from a retracted position nested with the members 18 and 10 to a projected position in prolongation of the members 18 and 10.

Means is provided for anchoring the trailer framework in a substantially horizontal position and comprises a hitch member 26 fixed to the framework at the forward end of the latter and in which is adjustably mounted a threaded anchor rod 27. At the upper end of the anchor rod is a crank 28 and adjacent its lower end is a support pad or disk 29 that is adapted to bear against the ground. Adjustment of the anchor rod 27 relatively to the hitch 26 will cause the framework 1 to rock about the axis of the wheels 9 so as to enable the platform 10 to be adjusted to a substantially horizontal position.

Adjustable support means designated generally by the reference character 30 is provided to assist in anchoring the trailer in position adjacent a body of water W, and comprises a pair of telescoping members 31 and 32 that are longitudinally adjustable relatively to one another. The inner member 32 is provided with a plurality of bores 33, any one of which is adapted to register with one or more diametrically opposed openings 34 formed in the outer member 31 and through which removable coupling means such as a cotter pin 35 may be inserted so as to maintain the members 31 and 32 in any selected position of relative vertical adjustment.

The lower end of the member 31 preferably is pointed as at 36. At a suitable level above the lower end of the member 36, a pad or disk 37 may be welded or otherwise suitably fixed to the member 31.

Clamping means 38 is provided for releasably clamping each supporting member 30 in a position to assist in anchoring the framework 1 in its dock position and to support the extension slides 18 and 21 in their projected positions. Each clamp member 30 comprises a generally C-shaped body 39 having a pair of opposed jaws 40 and 41 that are spaced apart a distance greater than the thickness of either of the members 18 or 21. An adjustable clamp screw 42 is threaded into the jaw 41 for movement toward and away from the jaw 40 so as to cooperate with the latter and clamp a member therebetween. The body of each clamp 38 also has a bore 43 extending therethrough for the slideable accommodation of the support rod 32, and an adjustable clamping screw 44 is engageable and disengageable with the member 32 so as to lock the body 39 at a selected vertical position on the support member.

In the operation of the apparatus, the boat trailer may be hitched to a towing vehicle, with the extensions 18 and 21 nested beneath the platform 10, and a boat B mounted on the trailer and secured in place. When the trailer reaches the body of water where it is to be launched, the trailer may be backed toward the water so as to permit launching of the boat B in the usual manner. Following the launching of the boat, the trailer may be moved so that it is on land, adjacent the water's edge. In this position the support rod 27 may be adjusted so as to support the forward end of the trailer with the platform 10 in a substantially horizontal position. A support member 30 then may be secured adjacent each side of the framework 1 at the rear end of the latter, by means of a pair of clamp members 38, so as to provide a rigid support for the framework 1, or, stated differently, disable the spring suspension 6. With the trailer framework 1 mounted in such manner that the platform 10 is substantially horizontal, either or both of the slide extensions 18 and 21 may be moved to their projected positions in prolongation of the platform 10 so as to extend over the surface of the water. Support members 30 may be removably clamped to the sections 18 and 21 at opposite sides of the latter. Preferably, a pair of support members 30 may be clamped to the member 18 at its rear end, and another pair of support members may be clamped to the slide 21 at its rear end. Intermediate support members 30 may be clamped to the slides 18 and 21 where desired.

Following the clamping of the support members, their length should be adjusted so as to enable the pads or disks 37 to rest upon the bottom of the body of water and provide firm support for the slide extensions. The platform 10, the member 18 and the slide extension 21, therefore, constitute a dock or pier extending out into the water and on which persons may walk so as to facilitate their access to and from the boat B when the latter is launched and these members 10, 18 and 21 may be said to have or comprise walkways.

The disclosed embodiment is representative of a presently preferred form of the invention, but is intended to be illustrative rather than definitive thereof. The invention is defined in the claims.

What is claimed is:

1. A boat trailer comprising frame means; ground engageable wheels supporting said frame means; boat hull accommodating means on said frame means for supporting a boat; at least one dock extension member supported by said frame means under said boat hull accommodating means for movement from a retracted position to a projected position in prolongation of said frame means; ground engageable support means for said extension member; and means for adjustably mounting said support means on said extension member to support the latter at substantially the level of said frame means when said extension member is in its said projected position; said ground engageable support means comprising an extensible and retractable device, and including locking means for locking said device in a selected position of adjustment.

2. The construction set forth in claim 1 including additional ground engageable support means, and additional means for adjustably mounting said additional support means on said frame means.

3. The construction set forth in claim 1 wherein said ground engageable support means is releasably secured to said dock extension member.

4. The construction set forth in claim 1 including means on said frame means forming a platform.

5. The construction set forth in claim 1 including stop means on said frame means limiting outward extension of said dock extension member.

6. A boat trailer construction comprising a framework; a platform supported on said framework; ground engaging wheel means supporting said framework; boat hull configured means on said framework for supporting a boat; a slideway supported by said framework beneath said platform; a dock slide member slideably supported by said slideway for sliding movements from a retracted position beneath and substantially parallel to said platform, to a projected position in prolongation of said platform; an auxiliary slide member; an additional slideway supported by and beneath the first mentioned slide member and slideably mounting said auxiliary slide member therebeneath for sliding movement from a first position nested with said first mentioned slide member to a projected position in prolongation thereof and in prolongation of said platform; and ground engaging support means adapted to extend from said slide member toward ground level.

7. The construction set forth in claim 6 including stop means on said frame means for limiting outward extension of said dock slide member.

8. The construction set forth in claim 6 including co-operable guide means on said first and auxiliary slide members for guiding the latter in their sliding movements.

9. The construction set forth in claim 6 in which said boat supporting means includes roller means supported by said framework and extending above the level of said platform.

10. The construction set forth in claim 6 including co-operable guide means on said framework and said slide member for guiding the latter in its sliding movements.

11. A boat trailer comprising frame means; ground engageable wheels supporting said frame means; boat hull configured means on said frame means for supporting a boat; at least one dock section member, having a walkway, supported by said frame means for movement from a retracted position nested with said boat hull configured means and frame means to a projected position extending from said frame means; ground engageable support means for said dock section member; and means for adjustably mounting said support means on said dock section member to support the latter at a level as a dock extending from said frame means when said dock section member is in its said projected position; said ground engageable support means comprising an extensible and retractable device, and including locking means for locking said device in a selected position of adjustment.

12. A boat trailer construction comprising a framework; ground engaging wheel means supporting said framework; boat hull configured means on said framework for supporting a boat; dock means, having a walkway, supported by said frame means for movement from a retracted position nested with said boat hull configured means and framework to a projected position extending from said frame means; second dock means, having a walkway, supported by the first mentioned dock section means for movement from a first position nested with said first mentioned dock section means to a projected position relative thereto; and ground engaging support means adapted to extend from said first and second dock section means toward ground level.

13. A boat trailer comprising frame means; ground engageable wheels supporting said frame means; boat hull configured means on said frame means for supporting a boat; a dock member, having a first walkway, supported by said frame means for movement from a generally co-extensive position relative to the boat hull configured means and frame means to a projected position relative thereto; a second dock member having a second walkway supported for movement from a first position generally co-extensive with said first dock section to a position in which said first walkway generally connects with said second walkway and ground engageable support means for at least one of said dock members.

References Cited by the Examiner
UNITED STATES PATENTS

| | | | |
|---|---|---|---|
| 2,636,745 | 4/1953 | Cartwright | 280—414 X |
| 2,797,008 | 6/1957 | Banker | 214—505 |
| 2,961,838 | 11/1960 | Vander Wilt | 61—48 |
| 2,997,192 | 8/1961 | Fortune | 214—515 |

GERALD M. FORLENZA, *Primary Examiner.*

A. J. MAKAY, *Assistant Examiner.*